(12) United States Patent
Shinkoda et al.

(10) Patent No.: US 6,746,102 B2
(45) Date of Patent: Jun. 8, 2004

(54) METHOD AND APPARATUS FOR FABRICATION OF COLOR FILTERS

(75) Inventors: Ichiro Shinkoda, Vancouver (CA); Daniel Gelbart, Vancouver (CA)

(73) Assignee: Creo SRL, Burnaby (CA)

( * ) Notice: Subject to any disclaimer, the term of this patent is extended or adjusted under 35 U.S.C. 154(b) by 0 days.

(21) Appl. No.: 10/186,979

(22) Filed: Jul. 2, 2002

(65) Prior Publication Data
US 2003/0026896 A1 Feb. 6, 2003

Related U.S. Application Data

(63) Continuation of application No. 09/631,710, filed on Aug. 3, 2000, now Pat. No. 6,443,571.

(51) Int. Cl.⁷ .............................. B41J 2/15; B41J 2/145
(52) U.S. Cl. ....................................................... 347/40
(58) Field of Search .............................. 347/40, 41, 42, 347/43, 20, 44, 47, 54, 55

(56) References Cited

U.S. PATENT DOCUMENTS

| | | |
|---|---|---|
| 4,054,882 A | 10/1977 | Ruscitto |
| 4,219,822 A | 8/1980 | Paranjpe |
| 4,232,324 A | 11/1980 | Tsao |
| 4,272,771 A | 6/1981 | Furukawa |
| 4,293,866 A | 10/1981 | Takita |
| 4,525,721 A | 6/1985 | Crean |
| 4,538,156 A | 8/1985 | Durkee |
| 4,673,303 A | 6/1987 | Sansone |
| 4,809,016 A | 2/1989 | Padalino |
| 5,070,345 A | 12/1991 | Lahut |
| 5,099,256 A | 3/1992 | Anderson |
| 5,124,720 A | 6/1992 | Schantz |
| 5,398,053 A | 3/1995 | Hirosawa |
| 5,796,418 A | 8/1998 | Silverbrook |
| 5,817,441 A | 10/1998 | Iwata et al. |
| 5,908,721 A | 6/1999 | Emoto et al. |
| 5,948,577 A | 9/1999 | Nakazawa et al. |
| 5,953,034 A | 9/1999 | Salomon et al. |
| 6,022,647 A | 2/2000 | Hirose et al. |

FOREIGN PATENT DOCUMENTS

| | | |
|---|---|---|
| JP | 6347637 A2 | 12/1994 |
| JP | 10197715 A2 | 7/1998 |

OTHER PUBLICATIONS

Hasegawa, T. et al., *Progress in Development of Color Filters by Pigment Ink Jet Printing*.

*Primary Examiner*—Raquel Yvette Gordon
(74) *Attorney, Agent, or Firm*—Oyen Wiggs Green & Mutala

(57) ABSTRACT

A method of fabricating color filters on the surface of a substrate involves ejecting fluid droplets onto a transfer surface and transferring the fluid droplets from the transfer surface to the substrate by bringing the fluid droplets on the transfer surface into contact with the substrate. While on the transfer surface the fluid droplets may have their spatial registration adjusted by interaction between the fluid droplets and a periodic pattern on the transfer surface. The fluid droplets may be subjected to various types of post-expulsion treatments on the transfer surface and may be cured on the substrate. Multiple passes may be made to eject the fluid droplets onto the transfer surface and/or to transfer the fluid droplets to the substrate.

46 Claims, 3 Drawing Sheets

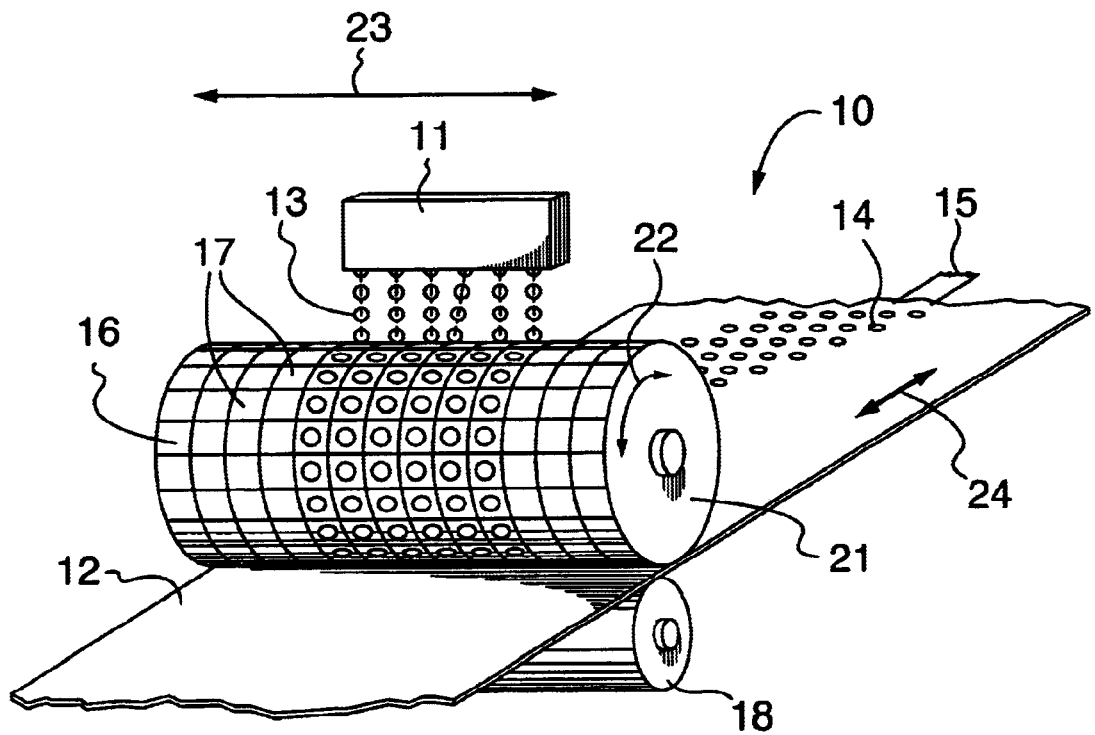
FIG. 1
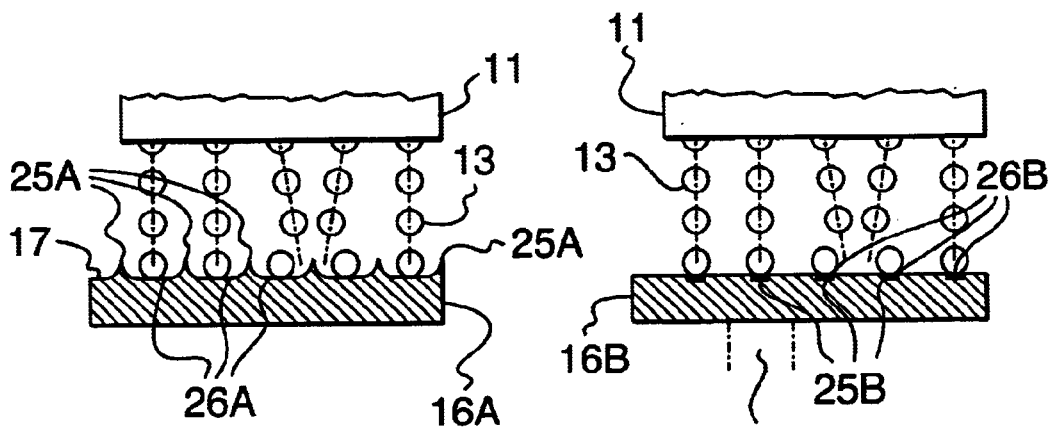
FIG. 2A  FIG. 2B

METHOD AND APPARATUS FOR FABRICATION OF COLOR FILTERS

CROSS-REFERENCE TO RELATED APPLICATION

This application is a continuation in part of application Ser. No. 09/631,710 filed 3 Aug. 2000 now U.S. Pat. No. 6,443,571.

TECHNICAL FIELD

The invention pertains to the use of fluid droplet expulsion techniques for the fabrication of various devices. Particular embodiments of the invention have application to making color liquid crystal displays.

BACKGROUND

Demand for liquid crystal displays and in particular color liquid crystal displays is increasing with the spread of portable personal computers, handheld computer and organizer devices and many other electronic devices. Current liquid crystal display fabrication techniques have relatively low yields, especially for large, color liquid crystal displays. Manufacturers of existing color liquid crystal devices often reject a significant percentage of the devices that come off of the assembly line. Such a low yield makes the per unit fabrication cost of each device relatively high. It is desirable to increase the yield and decrease the cost associated with the fabrication of color liquid crystal displays. In particular, it is desirable to reduce the cost associated with the fabrication of color filters.

Various methods have been proposed for the fabrication of color filters suitable for liquid crystal displays. Such techniques include: (i) a pigment dispersion method, where a photosensitive layer of a dispersed pigment is formed on a substrate and patterned to form a color pattern; (ii) a dyeing method, where a polymer layer is formed on a substrate, patterned using photolithography and then dipped into a dye bath to add color; (iii) an electrodeposition method, where a transparent electrode is patterned into a substrate and is dipped into an electrodeposition solution containing a pigment, a resin and an electrolytic solvent; and (iv) a printing method, where a pigment is dispersed into a thermosetting resin, the dispersion is printed and then cured by heat. These techniques typically require three separate repetitions to fabricate red, green and blue color filters, making color filter fabrication relatively time consuming and expensive. The large number of steps associated with these techniques also tends to decrease the production yield.

A relatively recent technique for the fabrication of color filters involves the use of inkjet nozzles to expel curable ink directly onto the transparent substrate of the liquid crystal display. Red, green and blue ink may be applied in a single pass of the inkjet head or in multiple passes. After the ink of various colors is applied, the ink is cured on the substrate to form color filters.

Inkjet techniques have various problems related to the coalescing of adjacent ink droplets and/or the mixing of various colored ink droplets on the surface of the transparent substrate prior to curing. This coalescing and mixing of adjacent ink droplets in an inkjet process may be due to a myriad if factors, including without limitation: poor registration of the inkjet head; surface energy characteristics of the ink droplets and the transparent substrate; and/or emission of ink droplets from the inkjet head at inconsistent or off center trajectories.

A number of techniques aimed at combating the coalescing and mixing of ink during inkjet fabrication of color filters include Japanese Patents No. JP6,347,637 (Isao) and No. JP10,197,715 (Hirohide et al.) and U.S. Pat. No. 5,817,441 (Iwata et al.), U.S. Pat. No. 5,948,577 (Nakazawa et al.), U.S. Pat. No. 5,908,721 (Emoto et al.) and U.S. Pat. No. 6,022,647 (Hirose et al.).

Isao describes the use of an ink having certain surface tension properties, which is expelled between barriers containing a flourine-based water repellent (hydrophobic) and oil repellent (oleophobic) agent.

Hirohide et al. teaches the photolithographic formation of light shielding barriers containing a hydrophobic/oleophobic compound having certain surface energy, and then using inkjet to expel ink between the light shielding barriers.

Iwata et al. describes the photolithographic formation of a pre-cured hydrophobic black matrix barrier pattern, followed by the inkjet application of ink to the regions between the black matrix barrier pattern.

Nakazawa et al. describes the formation of a light shielding black matrix barrier, followed by the inkjet application and curing of colored ink.

Emoto et al. describes a chemical formulation for a light shading colored resin that is applied to the substrate as a barrier.

Hirose et al. describes a technique for fabricating a color filter comprising forming barriers on the substrate, using inkjet to apply a certain volume of ink having certain surface tension properties into the regions between the barriers and curing the ink to form color filters.

Each of these prior art techniques describes the application of ink droplets directly to the substrate by ejecting the ink droplets from the nozzles of an inkjet head. An enduring problem with the expulsion of ink from ink jet nozzles, is that nozzles can fail or become clogged. For these and/or other reasons, ink droplets emitted from inkjet nozzles may be emitted at off-center or inconsistent trajectories. These deficiencies with inkjet expulsion may cause ink droplets to be ejected to improper locations on the substrate, cause ink droplets to coalesce on the substrate and/or lead to other defects in the fabrication of the color filters for liquid crystal displays. These drawbacks with the prior art techniques tend to increase the likelihood of fabrication errors and/or defects, which may lead to poor yield.

Even in circumstances where ink droplets are properly expelled by the nozzles of inkjet heads, these prior art techniques are limited by the spreading of ink droplets on the surface of the substrate and the overall resolution of current inkjet technology. These drawbacks with the prior art limit the availability of the prior art techniques for finer resolution (i.e. smaller pixel) applications.

There is a need for cost effective methods and apparatus for the precision formation of color filters for use in displays that ameliorate at least some of the difficulties associated with currently available techniques.

SUMMARY OF THE INVENTION

One aspect of the invention provides a method for fabricating color filters for a display on a surface of a substrate. The method comprises ejecting fluid droplets from one or more fluid droplet sources onto a transfer surface and transferring the fluid droplets from the transfer surface to the substrate by bringing the fluid droplets on the transfer surface into contact with the substrate.

The transfer surface may comprise a periodic pattern in at least one dimension. The method may comprise adjusting the spatial registration of the fluid droplets while they are on the transfer surface through an interaction between the fluid droplets and the periodic pattern on the transfer surface.

The periodic pattern on the transfer surface may comprise a plurality of fluid-droplet-retentive regions on an otherwise less fluid-droplet-retentive surface.

The method may comprise modifying the rheological characteristics of the fluid droplets and/or the size of the fluid droplets while the fluid droplets are on the transfer surface.

The method may comprise single or multiple passes between the fluid droplet sources and the transfer surface and/or single or multiple passes between the transfer surface and the substrate.

The method may comprise curing the fluid droplets on the substrate. Curing the fluid droplets may occur in one or more stages.

Another aspect of the invention involves a method of fabricating organic light emitting diodes (OLED's). Such a method comprises ejecting fluid droplets from one or more fluid droplet sources onto a transfer surface and transferring the fluid droplets from the transfer surface to the substrate by bringing the fluid droplets on the transfer surface into contact with the substrate.

Another aspect of the invention involves a method of fabricating polymer semiconductors. Such a method comprises ejecting fluid droplets from one or more fluid droplet sources onto a transfer surface and transferring the fluid droplets from the transfer surface to the substrate by bringing the fluid droplets on the transfer surface into contact with the substrate.

Further aspects of the invention and features of specific embodiments of the invention are described below.

BRIEF DESCRIPTION OF THE DRAWINGS

In drawings which depict non-limiting embodiments of the invention:

FIG. 1 depicts a method and apparatus for the formation of a color filter on a substrate according to one embodiment of the invention;

FIGS. 2A and 2B are cross-sectional views of a printing head applying ink to a transfer surface in accordance with two particular embodiments of the present invention;

DETAILED DESCRIPTION

Figure 3:
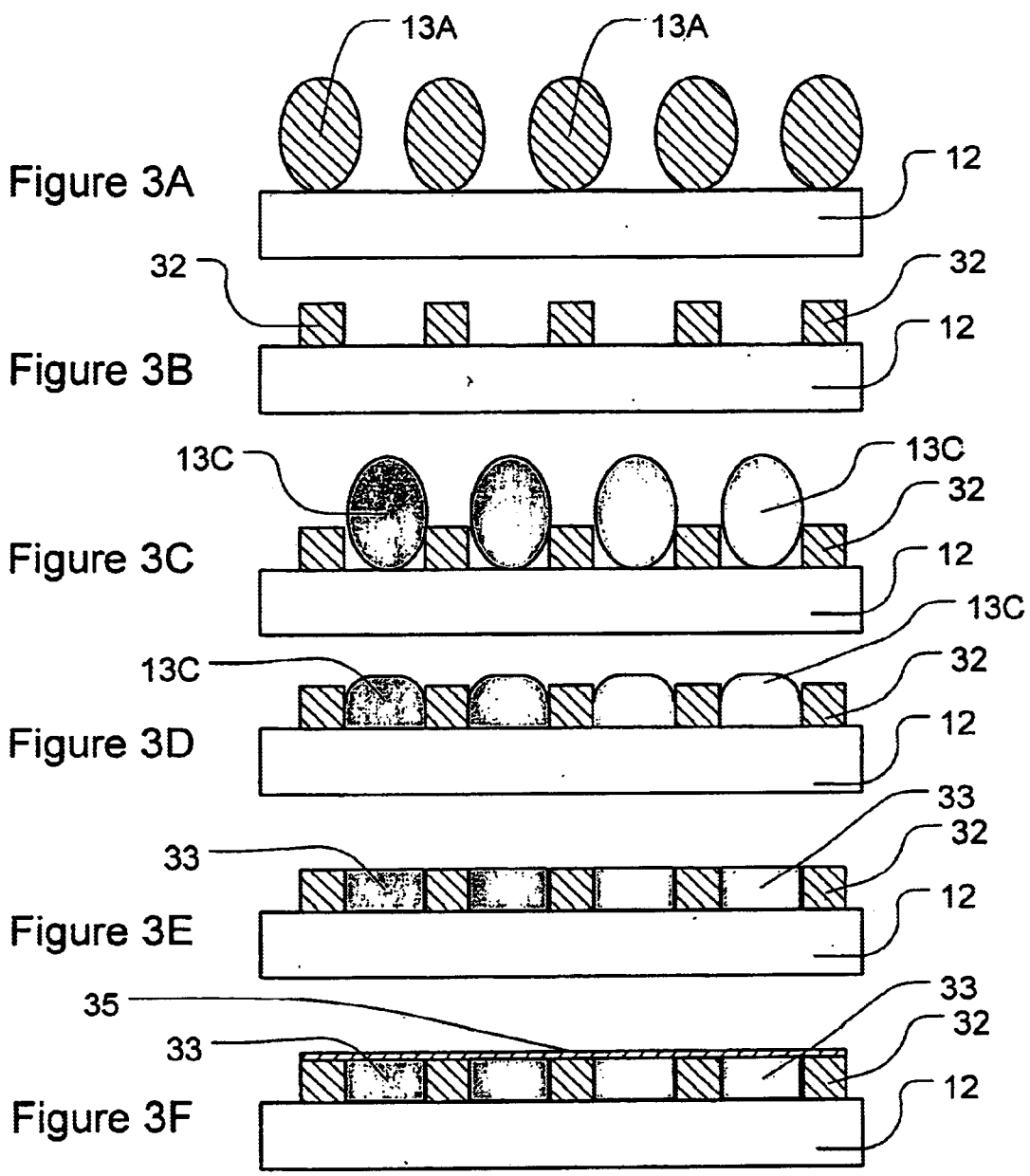
FIGS. 3A to 3F illustrate a method of forming a color filter according to the present invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Methods and apparatus for forming a color filters for use in displays, such as liquid crystal displays are described herein. Fluid droplets of ink are expelled onto a transfer surface. The droplets may be expelled by an inkjet head. The ink jet head may expel the ink droplets onto the transfer surface in a single pass or in multiple passes. In general, the ink droplets may be colored ink droplets which are used to form the color filters themselves or may be opaque ink droplets used to form barrier regions between color filters.

The transfer surface is patterned in a manner that provides a periodic plurality of low energy regions, such that the fluid ink droplets on the transfer surface register themselves to the low energy regions. Certain characteristics of the ink droplets, such as their size and/or other rheological properties, may be altered in post-expulsion treatments that take place while the droplets are on the transfer surface. The precisely positioned colored ink droplets are then transferred to a substrate in the precise locations required to form color filters. The ink droplets may be transferred to the substrate in a single pass or in multiple passes. In general, the transfer surface may be of any shape or design suitable to transfer the ink droplets to the substrate.

Once on the transfer substrate, the precisely located ink droplets may be cured, if required, to form color filters. The ink droplets may be cured in a single stage or in multiple stages. A protective coating may also be applied over-top of the color filters.

The word "ink" and the phrase "ink droplet(s)" are used as a matter of convenience throughout this description. While preferred embodiments of the invention employ ink and ink droplets, the invention may generally employ any fluid capable of being ejected from an inkjet nozzle, such as: ink, resin, photo-resist and thermal resist, for example. Accordingly, the word "ink" and the phrase "ink droplet(s)" should be interpreted in a broad sense, to include any suitable fluid capable of being ejected from an inkjet nozzle. In general, colored ink used in this invention may be a pigment type ink and/or a dye type ink.

Examples of inks that are well suited for use in the present invention include, without limitation, those inks discussed in U.S. Pat. No. 5,817,441 (Iwata et al.), U.S. Pat. No. 5,908,721 (Emoto et al.), U.S. Pat. No. 5,948,577 (Nakazawa et al.) and U.S. Pat. No. 6,022,647 (Hirose et al.), which are hereby incorporated by reference.

FIG. 1 depicts a particular embodiment of an apparatus 10 for use in the fabrication of a color filter according to the present invention. Inkjet head 11 comprises nozzles (not shown) that are individually addressable to expel ink droplets 13 at desired locations on transfer surface 16. Inkjet head 11 may comprise a number of sets of nozzles, each set of nozzles expelling droplets of a different ink. In the illustrated embodiment, transfer surface 16 is disposed on the cylindrical surface of a drum 21. In some embodiments, transfer surface 16 may be the cylindrical surface of drum 21. Transfer surface 16 comprises a periodic plurality of cells 17, which have properties (described further below) that cause ink droplets 13 to position (i.e. register) themselves within cells 17.

Drum 21 rotates in either or both of the directions indicated by arrow 22. A controller (not shown) individually addresses each nozzle in inkjet head 11 to control the expulsion of ink droplets 13. The controller may also control the relative movement of inkjet head 11 and drum 21 to coordinate the expulsion of ink droplets 13 with the rotation of drum 21. Inkjet head 11 may also step across drum 21 in the lateral directions of arrow 23. In this manner, if desired, an ink droplet 13 may be expelled into any or each of cells 17. Inkjet head 11 may apply ink droplets 13 to cells 17 of transfer surface 16 in a single pass or in multiple passes. Multiple passes of inkjet head 11 over transfer surface 16 may be used where inkjet head 11 must be stepped across transfer surface 16 in the directions of arrow 23. Alternatively or additionally, multiple passes of ink jet head 11 may also be used where each pass of inkjet head 11 applies a single color of ink droplets 13. For example, red ink droplets 13 may be applied to transfer surface 16 in a first pass, blue ink droplets 13 may be applied to transfer surface 16 in a second pass and green ink droplets 13 may be applied to transfer surface 16 in a third pass. In some embodiments of the invention where barriers are required on the substrate, opaque ink may also be applied from inkjet head 11 to transfer surface 16 in a separate pass. In a single pass embodiment, all ink droplets 13 (including opaque ink droplets in embodiments requiring barriers) may be applied from inkjet head 11 to transfer surface 16 in a single pass.

After ink droplets 13 register themselves in cells 17 of transfer surface 16, the substrate 12 of a liquid crystal display is rolled between drum 21 and an elastomeric roller 18 in either or both of the scan directions indicated by arrow 24. This brings ink droplets 13 into contact with substrate 12. The droplets 13 are transferred onto substrate 12 in their desired locations. As with the expulsion of ink droplets 13 from inkjet head 11, ink droplets 13 may be transferred from transfer surf ace 16 to substrate 12 in a single pass or in multiple passes. Multiple passes between transfer surface 16 and substrate 12 may be used to apply a single color of ink droplets 13 in each pass. For example, red ink droplets 13 may be applied to selected locations on transfer surface 16 and then transferred to substrate 12 in a first pass, blue ink droplets 13 may be applied to selected locations on transfer surface 16 and then transferred to substrate 12 in a second pass and green ink droplets 13 may be applied to selected locations on transfer surface 16 and then transferred to substrate 12 in a third pass.

In some embodiments of the invention where barriers are required on substrate 12, opaque ink droplets for deporting onto substrate 12 to from the barriers may also be applied to substrate 12 in a separate pass. Preferably, the pass in which opaque ink droplets are applied may occur prior to the passes in which colored ink droplets 13 are applied. Ink droplets 13 that have been transferred to substrate 12 may be cured by heat, irradiation or some other technique after each pass. In a single pass embodiment, all ink droplets 13 (including opaque ink droplets in embodiments requiring barriers) may be transferred from transfer surface 16 to substrate 12 in a single pass.

In general, an ink droplet 13 expelled from the nozzle of an inkjet head onto a surface (i.e. such as transfer surface 16 or substrate 12) will deform when it hits the surface and will eventually come to rest on the surface. Ink droplet 13 will assume a shape on the surface. Typically, this shape will be quasi-spherical in nature and the distortion away from a perfect spherical shape will be determined by the surface energy of the surface material(s) and the surface tension of ink droplet 13. The precise shape of ink droplet 13 will assume on transfer surface 16 depends on the particular combination of liquid ink and surface materials.

Typically, ink may be water-based or oil-based. A surface that repels water-based ink is said to be hydrophobic and a surface that attracts water-based ink is said to be hydrophilic. Similarly, a surface that repels oil-based ink is said to be oleophobic and a surface that attracts oil-based ink is said to be oleophilic. A single monolayer of material may change the behavior of a surface between hydrophilic and hydrophobic or between oleophilic and oleophobic.

A water-based ink droplet 13 on a hydrophilic surface tends to distort away from a spherical shape. The surface energy of a hydrophilic surface material is greater than the surface tension of the ink. With such a combination of ink and surface material, ink droplet 13 exhibits a degree of adhesion to the surface material and is said to "wet" the surface material. This type of ink and material combination is not particularly well suited for a transfer surface (i.e. such as transfer surface 16 of FIG. 1), because any ink that wets the transfer surface is difficult to transfer from the transfer surface to the desired printing surface (i.e. substrate 12 of FIG. 1). Oil-based ink droplets on oleophilic surfaces exhibit similar properties.

In contrast, if a surface is hydrophobic, then a water-based ink droplet 13 tends to maintain a more nearly spherical shape. The surface energy of a hydrophobic material is less than the surface tension of the water-based ink. With such a combination of surface material and ink, ink droplets 13 do not adhere well to the surface. Such non-adhering ink droplets 13 may be easily transferred from a transfer surface (i.e. such as transfer surface 16 of FIG. 1) to a final printing surface (i.e. substrate 12 of FIG. 1). However, a potentially undesirable consequence of having ink droplets 13 that do not adhere to a surface is that immediately adjacent ink droplets 13 on the surface may travel across the surface and may exhibit a tendency to coalesce with one another. Such coalescing causes the droplets to mix with one another and causes distortion in the positions of the droplets on the surface. Oil-based ink droplets on oleophobic surfaces exhibit similar properties.

FIG. 2A depicts a cross-sectional view of a transfer surface 16A according to a first embodiment of the invention. Transfer surface 16A is constructed to improve printing accuracy and to prevent the coalescing of adjacent ink droplets 13, by providing a structure which causes ink droplets 13 to register themselves at desired locations. Transfer surface 16A comprises a hydrophobic material, such as TEFLON™ or silicone. Alternatively or in addition, transfer surface 16A may be treated with a coating layer of hydrophobic material, such as silicone or flourocarbon to achieve its hydrophobic state. The particular selection of hydrophobic materials for transfer surface 16A depends on the nature and composition of ink droplets 13 being used in a particular application. Specifically, the selection of hydrophobic material depends on the surface energy of the material and the surface tension of ink droplets 13. Transfer surface 16A is patterned with a periodic array of cells 17, each of which comprises a depression 26A surrounded by elevated ridges 25A.

In the embodiment illustrated in FIG. 1, cells 17 are periodic in two dimensions (for example, the lateral direction 23 and the orthogonal scan direction indicated by arrow 24). In other embodiments (not shown), the periodic array of cells 17 may be periodic in only one dimension (for example, the lateral direction indicated by arrow 23 of FIG. 1). In still other embodiments (not shown), cells 17 may be assembled into groups of cells, each group comprising a plurality of cells. Preferably, a group of cells may comprise three or more cells, where each cell in a group may be used to hold a different color of ink droplet. These groups of cells may be periodic in one or more dimensions.

In certain embodiments, the spatial period of cells 17 may be the same as the dot pitch obtained from inkjet head 11. For example, if inkjet head 11 has 600 dot per inch resolution, then the centers of the depressed areas 26A of cells 17 may be separated from one another by $1/600$ of an inch in each of the scan direction and the lateral direction. In preferred embodiments, ridge areas 25A may be approximately $1/2400$ of an inch (10 microns) in width and up to $1/4800$ of an inch (5 microns) in height. In other embodiments, ridge areas 25A may be greater than 5 microns in height or substantially less than 5 microns in height.

An example of a commercial product upon which the texturing depicted in FIG. 2A may be created is a printing plate known as PEARLdry™ and manufactured by Presstek, Inc., New Hampshire. Such printing plates can be written with any desired pattern and applied to the cylindrical surface of drum 21 prior to or after being imaged.

Suitable transfer surfaces 16A may also be produced by chemical vapor deposition (CVD) or plasma vapor deposition (PVD) of hydrophobic materials on the substrate of the transfer member.

In operation, one ink droplet 13 may be expelled by inkjet head 11 into any or each of cells 17. The choice (made by the controller) as to whether an ink droplet 13 is expelled into a particular cell 17 is determined by whether ink is required at a corresponding location of substrate 12 to form the color filter. The periodic array of cells 17 provides a grid of minimum energy regions based on a varying combination of surface energy and surface tension across a cell 17. In the embodiment of FIG. 2A, it is predominantly the surface tension of water-based ink droplets 13 that ensures that droplets 13 will locate themselves at or near the centers of depressed regions 26A of cells 17. The grid of minimum energy regions 26A on transfer surface 16A helps to correct the positions of any ink droplets 13 that may be out of position due to inconsistent expulsion trajectories from the nozzles of inkjet head 11. The grid of minimum energy regions 26A on transfer surface 16A also prevents individual ink droplets 13 from coalescing with one another on transfer surface 16A by tending to make ink droplets 13 register themselves at the desired locations. The hydrophobic nature of transfer surface 16A ensures that ink droplets 13 will transfer well to the surface of substrate 12 when they are placed in contact with substrate 12.

FIG. 2B depicts a cross-sectional view of a transfer surface 16B according to another embodiment of the invention. Transfer surface 16B is a smooth surface, which comprises a semi-hydrophobic material, such as a metal (e.g. anodized aluminum), glass, ceramic or polymer. A highly hydrophobic material, such as silicone or fluorocarbon is then applied to surface 16B in regions 25B to form a periodic array of cells 17, which comprise semi-hydrophobic regions 26B surrounded by highly hydrophobic regions 25B. Alternatively or additionally, transfer surface 16B of FIG. 2B may be fabricated using a highly hydrophobic material as a base material and then applying regions 26B of semi-hydrophobic material to the surface to form the periodic array of cells 17.

The particular selection of highly hydrophobic materials (for regions 25B) and/or semi-hydrophobic materials (for regions 26B) depends on the nature and composition of ink droplets 13 being used in a particular application. Specifically, what is highly hydrophobic and what is semi-hydrophobic depend on the surface energy of the materials and the surface tension of the ink droplets 13.

As with the embodiment of FIG. 2A, the regular pattern of cells 17 on transfer surface 16B may be periodic in two dimensions as illustrated in FIG. 1 (for example, the lateral direction 23 and the orthogonal scan direction indicated by arrow 24). In other embodiments (not shown), cells 17 may be periodic in a single dimension (for example, the lateral direction indicated by arrow 23 of FIG. 1). In still other embodiments (not shown), cells 17 may be grouped into groups of cells, each group comprising a plurality of cells. Preferably, a group of cells may comprise three or more cells, where each cell in a group may be used to hold a different color of ink droplet. The groups of cells may be periodic in one or more dimensions.

As with the embodiment of FIG. 2A, ink droplets 13 may be expelled by inkjet head 11 into each or any of cells 17. The choice (made by a controller) as to whether an inkjet droplet 13 is expelled into a particular cell 17 is determined by whether ink is required at a corresponding location on substrate 12 to form the color filter. The periodic array of cells 17 formed by semi-hydrophobic regions 26B and highly hydrophobic regions 25B forms a regular pattern having minimum energy regions at or near the centers of semi-hydrophobic regions 26B. These minimum energy regions tend to make water-based ink droplets 13 move away from highly hydrophobic regions 25B and towards semi-hydrophobic regions 26B. The regular pattern of minimum energy regions 26B on transfer surface 16B helps to correct the positions of any ink droplets 13 that may be out of position due to inconsistent expulsion trajectories from the nozzles of inkjet head 11. The regular pattern of minimum energy regions 26B on transfer surface 16B also prevents the coalescing of adjacent ink droplets 13 on transfer surface 16B by tending to make ink droplets 13 register themselves at the desired locations. The hydrophobic nature of the transfer surface 16B ensures that ink droplets 13 will transfer well to the surface of substrate 12 when they are placed in contact with substrate 12.

In a third embodiment (not depicted) a transfer surface comprising a combination of the previous two embodiments may be employed. Such a combination involves a shaped hydrophobic transfer surface similar to that of FIG. 2A with a plurality of cells formed with ridges and depressed regions (see ridges 25A and depressed regions 26A of FIG. 2A). The depressed regions of the transfer surface may then be augmented to make them more hydrophilic. Alternatively or additionally, the ridges of the transfer surface may be augmented to make them highly hydrophobic. In such a combination embodiment, surface tension of the water-based ink droplets 13 combined with surface energy created by the ridges and depressed regions act together to cause ink droplets 13 to locate themselves in the depressed regions near the center of the cells on the transfer surface. Once again, this self-registration of ink droplets 13 overcomes inconsistent expulsion trajectories from the nozzles of inkjet head 11 and enables ink droplets 13 to be transferred to substrate 12 in their correct positions without coalescing with one another on the transfer surface. The hydrophobic nature of the transfer surface also ensures that ink droplets 13 will transfer well to the surface of substrate 12 when they are placed in contact with substrate 12.

In some embodiments, it can be advantageous to treat or modify ink droplets 13 on transfer surface 16 prior to transferring them to substrate 12. In particular, the size and Theological properties of ink droplets 13 may be changed by various forms of post-expulsion processing, including, without limitation: electromagnetic irradiation, vacuum treatment, gaseous flow, chemical treatment and heat treatment which may be performed by microwave heating, radiative heating and/or conduction heating.

In particular, while ink droplets 13 are on transfer surface 16, it may be advantageous to cure or partially cure ink droplets 13, to increase the viscosity of ink droplets 13, to change the water solubility of ink droplets 13, to change the surface energy of ink droplets 13, to evaporate some or all of the solvent contained in ink droplets 13 or to reduce the size of ink droplets 13. Particular methods and apparatus for treatment of ink droplets 13 on a transfer surface are discussed in a co-owned U.S. Patent Application, entitled "Method for Imaging with UV Curable Inks", filed 24 May 2002 (serial no. as yet unassigned), which names as inventors Daniel Gelbart and Murray Figov and which is hereby incorporated by reference.

FIGS. 3A to 3F depict cross-sectional views of substantially transparent substrate 12 and a particular embodiment of a process 100 for making color filters according to the present invention. Although substrate 12 is generally made of glass, other materials having sufficient mechanical strength may be used. For example, other substantially transparent materials, such as plastic, may be used for substrate 12. Alternatively, reflective displays may be formed using silicon as a substrate 12. For the sake of clarity, FIGS. 3A to 3F show only the surface of substrate 12. FIGS. 3A to 3F do not show how ink droplets 13 are ejected onto transfer surface 16, where they are registered to low energy regions 26. FIGS. 3A to 3F also do not show how ink droplets 13 are transferred from transfer surface 16 to substrate 12.

Referring to FIG. 3A, a first set of ink droplets 13A are transferred from transfer surface 16 (where they were self-registered and where they may have been treated by post-expulsion processing) to substrate 12 in a first pass between transfer surface 16 and substrate 12. Since ink droplets 13A were self-registered on transfer surface 16, they are located in the desired locations and are sufficiently far apart that they do not coalesce with one another on the surface of substrate 12. Ink droplets 13A comprise opaque ink.

In FIG. 3B, ink droplets 13A, which have been deposited on the surface of substrate 12, are cured to form barriers 32. Curing may comprise processes, such as: irradiation (i.e. with electromagnetic radiation, which may include visible light, ultraviolet radiation and/or infrared radiation), vacuum treatment, gaseous flow (i.e. air flow and/or flow of another gas, such as $N_2$), chemical treatment, heat treatment or a combination these techniques. Heat treatment may comprise microwave heating, radiative heating and/or conduction heating. Barriers 32 may be used to help prevent other ink droplets from coalescing on the surface of substrate 12 and may also be used to "hide" the transistors used to form liquid crystal displays.

In FIG. 3C, colored ink droplets 13C are transferred from transfer surface 16 (where they were self-registered and where they may have been treated by post-expulsion processing) to substrate 12 in a second pass between transfer surface 16 and substrate 12. Since ink droplets 13C were self-registered on transfer surface 16, they are located in the desired locations and are sufficiently far apart that they do not coalesce with one another on the surface of substrate 12. In the illustrated embodiment, barriers 32 may also help to prevent ink droplets 13C from coalescing with one another. In the illustrated embodiment, ink droplets 13C of all colors (for example, red, blue and green) are transferred to substrate 12 in a single pass between transfer surface 16 and substrate 12. In alternative embodiments, ink droplets 13C may be transferred to substrate 12 in multiple passes between transfer surface 16 and substrate 12. Such multiple passes may transfer individual colors of ink droplets 13C (for example, red ink droplets in a first pass, blue ink droplets in a second pass, and green ink droplets in a third pass). Alternatively or additionally, such multiple passes may be used in conjunction with interleaving techniques or other techniques to help prevent coalescing of ink droplets 13C on the surface of substrate 12. For example, ink droplets 13C positioned immediately adjacent to one another on substrate 12 may be transferred on successive passes.

In FIG. 3D, ink droplets 13C may spread over the areas between barriers 32, but barriers 32 prevent ink droplets 13C from coalescing with one another. Ink droplets 13C, which have been deposited on the surface of substrate 12, are cured to form color filters 33 as shown in FIG. 3E. Curing may comprise processes, such as: irradiation (i.e. with electromagnetic radiation, which may include visible light, ultraviolet radiation and/or infrared radiation), vacuum treatment, gaseous flow (i.e. air flow and/or flow of another gas, such as $N_2$), chemical treatment, heat treatment or a combination of these techniques. Heat treatment may comprise microwave heating, radiative heating and/or conduction heating.

In FIG. 3F, a protective film 35 may be applied over color filters 33 if necessary. Protective film 35 may comprise a resinous film, curable by irradiation, heat, or a combination thereof. Alternatively, protective film 35 may comprise an organic film formed by vapor deposition or sputtering. Preferably, protective film 35 is transparent and is sufficiently durable to withstand processing.

The description of method 100 in FIGS. 3A to 3F serves as a non-limiting example of how color filters 33 may be formed in accordance with the present invention. It will be appreciated by those skilled in the art, that method 100 represents only one technique of employing a patterned transfer surface 16 to form a color filter. Many variations of method 100 are possible and should be understood to form a part of the present invention. Some of these variations are discussed further below.

Figure 4:
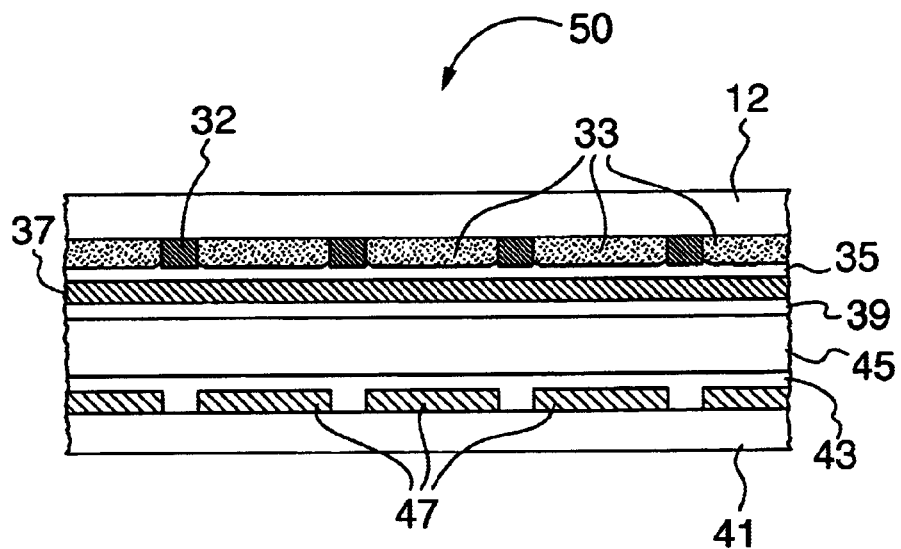
FIG. 4 is a cross-sectional view of a particular embodiment of a liquid crystal display comprising a color filter fabricated in accordance with the method of FIG. 3; and, FIG. 5 depicts an alternative embodiment of a transfer surface according to the invention.

FIG. 4 is a schematic cross-sectional view of one embodiment of a liquid crystal device (LCD) 50 having color filters 33 produced as described above. LCD 50 is an active-matrix-type LCD using thin film transistors (TFT's). LCD 50 comprises substrate 12, color filters 33, common electrode 37, alignment film 39, counter substrate 41, alignment film 43, and liquid crystal compound 45. The separation between substrate 12 and counter-substrate 41 typically ranges between 2–5 $\mu$m.

LCD 50 is produced by encapsulating liquid crystal compound 45 between substrate 12 (i.e. the one having color filters 33) and counter-substrate 41. A matrix of TFT's (not shown) and pixel electrodes 47 are formed on the counter-substrate 41, such that corresponding pixel electrodes 47 are aligned with color filters 33 formed on substrate 12. Transparent common electrode 37 is placed on the inner surface of substrate 12 and alignment films 39 and 43 are formed on the inner surfaces of substrate 12 and counter-substrate 41 respectively. Alignment films 39 and 43 are subjected to rubbing treatment, so that liquid crystal molecules in compound 45 are oriented in a given direction.

Polarizers (not shown) may be bonded to the outer surfaces of substrate 12 and counter-substrate 41 to function as light shutters in the display. The polarizers act to vary the transmittance of the light from a back light (not shown), which may include a flourescent light and a scattering plate.

The description of LCD 50 depicted in FIG. 4 serves as a non-limiting example of how a particular embodiment of the color filter fabrication technique of the present invention may be applied in the formation of a LCD. The color filters 33 of LCD 50 may be formed according to method 100 of FIGS. 3A to 3F. It will be appreciated by those skilled in the art that LCD 50 of FIG. 4 represents only one type of LCD and that method 100 of forming color filters 33 represents only one technique of forming color filters according to the present invention. Other types of LCD's may incorporate the color filter fabrication technique 100 of FIGS. 3A to 3F. In addition, method 100 of forming color filters 33 may be varied as discussed herein and may result in LCD's having different construction. Other well known LCD parts and processes may be applied in conjunction with the color filter fabrication technique of the present invention.

As will be apparent to those skilled in the art in the light of the foregoing disclosure, many alterations and modifications are possible in the practice of this invention without departing from the spirit or scope thereof. For example:

Method 100 depicted in FIGS. 3A to 3F shows that opaque ink droplets 13A may be transferred in a first pass between transfer surface 16 and substrate 12 in FIG. 3A. Opaque ink droplets 13A are then cured to form opaque barriers 32 in FIG. 3B. In some embodiments, rather than forming barriers 32 from ink droplets 13A as shown in FIG. 3, barriers 32 may be formed in a separate process prior to the transfer of colored ink droplets 13C in FIG. 3C. Such separate processes may include photolithography, for example. In still other embodiments, opaque ink droplets 13A used to form barriers 32 may be transferred from transfer surface 16 to the surface of substrate 12 during the same pass as colored ink droplets 13C used to form color filters 33.

Method 100 depicted in FIGS. 3A to 3F shows that opaque ink droplets 13A may be transferred in a first pass between transfer surface 16 and substrate 12 in FIG. 3A. Opaque ink droplets 13A are then cured to form opaque barriers 32 in FIG. 3B. Barriers 32 help to prevent colored ink droplets 13C from coalescing with one another on substrate 12. In some embodiments, because of the self-registration of ink droplets 13 on transfer surface 16 and because of possible post-expulsion treatment of ink droplets 13 on transfer surface 16, barriers 32 may not be required. In such embodiments, the barrier formation steps of FIGS. 3A and 3B are not required.

Method 100 depicted in FIGS. 3A to 3F discusses how opaque ink droplets 13A are transferred in a first pass between transfer surface 16 and substrate 12 to form barriers 32 after curing and how colored ink droplets 13C are transferred from transfer surface 16 to substrate 12 in a second pass to form color filters 33. In some embodiments, after the formation of barriers 32, colored ink droplets 13C may be directly inkjetted into the spaces between barriers 32, without using an intermediate transfer surface 16.

Method 100 depicted in FIGS. 3A to 3F shows that ink droplets 13A are cured in FIG. 3B and ink droplets 13C are cured in FIG. 3E. Depending on the particular combination of material used for the surface of substrate 12, the ink used for droplets 13A and/or 13C, and on the post-expulsion treatment of ink droplets 13A and 13C on transfer surface 16, these curing procedures of FIGS. 3B and 3E may not be required.

Whether or not barriers 32 are employed (see FIGS. 3A to 3F), additional protection from coalescing of adjacent ink droplets 13 on substrate 12 may be achieved using a variety of interleaving techniques. Interleaving involves a plurality of passes of inkjet head 11 over transfer surface 16 and corresponding passes between transfer surface 16 and substrate 12. Immediately adjacent printing locations are not printed on the same pass. Any ink droplets 13 required to address spaces between locations printed on the first pass may be expelled from inkjet head 11 onto transfer surface 16 and transferred to substrate 12 as required on one or more subsequent passes.

Redundancy may be built into the invention by having more than one nozzle in inkjet head 11 be addressed to deposit ink into a particular cell 17 of transfer surface 16. Redundancy may be used in situations where inkjet nozzles are blocked or otherwise fail to perform as expected.

The relationship between the spacing of inkjet nozzles, the resolution of inkjet nozzles and the cellular period on transfer surface 16 need not be one to one. These parameters may be integer multiples of one another. In the case where the nozzle spacing is a multiple of the cellular period, inkjet head 11 may be translated laterally (i.e. in the direction of arrow 23 of FIG. 1) to ensure that ink droplets 13 are deposited into each desired cell 17, thereby ensuring that the final image has the full resolution of transfer surface 16. Similarly, where the resolution of inkjet nozzles is finer than the spatial period of cells 17 on transfer surface 16, ink droplets 13 may be deposited only in the locations of cells 17.

The above discussion of FIGS. 2A and 2B involved water-based ink and a generally hydrophobic transfer surface 16. Although there are fewer oleophobic than hydrophobic candidate materials available industrially, the same principle of operation may be applied using these materials. For example, a silicone-coated transfer surface 16, which is oleophobic, will repel droplets 13 of oil-based ink. If such a silicone-coated surface is patterned with a periodic pattern of ridges 25A and depressed regions 26A (see FIG. 2A), it may cause oil-based ink droplets 13 to register to the pattern. In a second example, a transfer surface similar to transfer surface 16B of FIG. 2B may be constructed using highly-oleophobic materials in regions 25B and semi-oleophobic materials in regions 26B. Oil-based ink droplets 13 may then register to such a pattern. These techniques are important when ultra-violet-cured inks are used, as many ultra-violet types of ink are not water-based.

Figure 5:
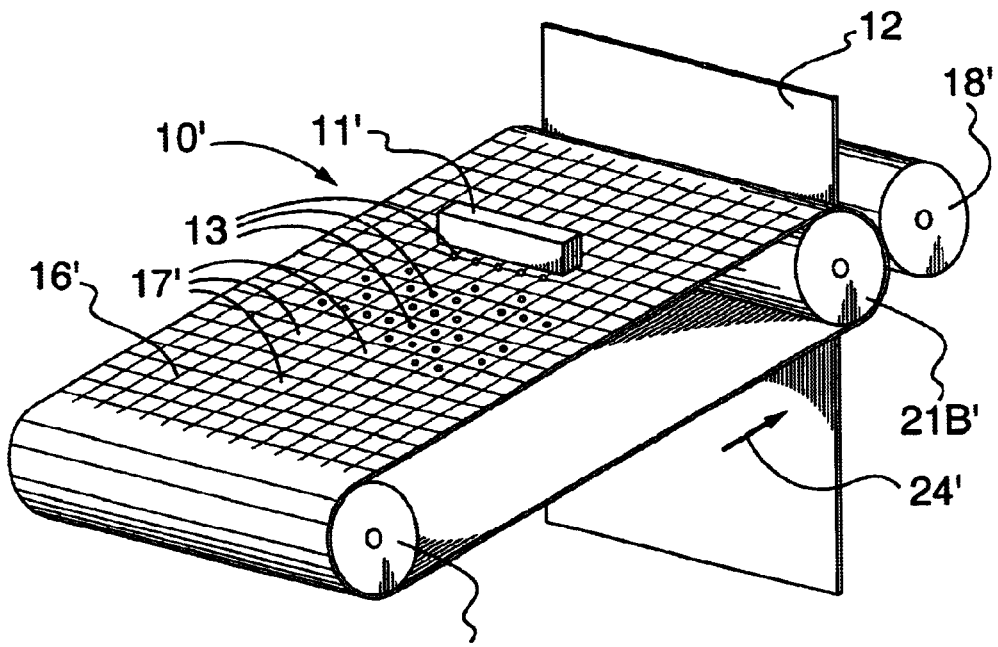

FIG. 5 depicts an alternative embodiment of an apparatus 10' according to the invention. In the embodiment of FIG. 5, transfer surface 16' is shaped in a conveyor belt-like configuration that is entrained over two cylinders 21A' and 21B'. A controller (not shown) causes inkjet head 11' to eject ink droplets 13 into each or any of cells 17' on transfer surface 16' in a manner similar to that of the embodiment of FIG. 1. Cells 17' have properties similar to those discussed above, which cause ink droplets 13 to register themselves to the low energy regions of individual cells 17'. For the sake of clarity, only a small number of cells 17' are shown on transfer surface 16' of FIG. 5. Transfer surface 16' is caused to move in the scan direction 24' by one or both of cylinders 21A' and 21B'. Substrate 12 is positioned between transfer surface 16' and roller 18'. As transfer surface 16' moves relative to substrate 12, ink droplets 13 are transferred to the surface of substrate 12.

The drum embodiment of FIG. 1 and the conveyor belt-like embodiment of FIG. 5 are not the only embodiments for a transfer surface. Other embodiments for a transfer surface may also be envisaged, where the transfer surface is flat in shape and the ink is transferred from the transfer surface to the substrate by stamping the substrate and the transfer surface together. In general, the invention should be considered to be independent of the macroscopic shape of the transfer surface and the manner in which the ink droplets are transferred from the transfer surface to the substrate.

The invention may be applied to a wide range of substrate materials, such as paper, plastic, polymers, glass, metal, ceramic, silicon and printing plates. Silicon may be used as a substrate to form a reflective type of liquid crystal display.

While the invention has been described in detail as applied to color filters for liquid crystal display fabrication applications, it is equally applicable to the deposition of other materials in liquid form for other applications. Examples include: printing, the manufacture of printed circuit boards and semiconductor wafer processing via the use of photo-lithographic materials, such as photo-resists and other resins.

Inkjet head 11 may comprise a number of separate inkjet heads which each eject droplets of different ink onto a transfer surface 16. These separate inkjet heads may be spaced-apart. Droplets expelled by one of the separate inkjet heads may be subjected to post expulsion processing, as described above, before a next set of droplets is applied by a next one of the separate inkjet heads. The post-expulsion processing may shrink the ink droplets on the transfer surface.

The invention may be applied to the fabrication of organic light emitting diodes (OLED's). In such applications, the organic material used to form the diodes may be expelled in liquid form by an inkjet nozzle or the like onto a transfer surface and then transferred from the transfer surface to a substrate. The transfer surface used in such an application may be patterned in a manner similar to the transfer surfaces discussed above and depicted in FIG. 2A and/or FIG. 2B. In addition to transferring the fluid droplets from the transfer surface directly to the substrate, such techniques may comprise forming layers of organic material on the substrate. For example, layering may be achieved by transferring fluid droplets to the substrate on a first pass, optionally curing the fluid droplets on the substrate and then depositing additional fluid droplets onto the previously transferred fluid droplets in successive passes.

The techniques of the present invention could be applied to the fabrication of polymer semiconductors. For example, fluid droplets could be expelled by an ink jet head onto a transfer surface and then transferred from the transfer surface to a substrate. The transfer surface used in such polymer semiconductor fabrication application may be patterned in a manner similar to the transfer surfaces discussed above and depicted in FIG. 2A and/or FIG. 2B. Layering and curing could also be used in the fabrication of polymer semiconductors.

The invention could be employed in the field of stereolithography, where 3-dimensional models are constructed from photosensitive resins by various means. The same principle of locally corrected deposition could be used to deposit resin in liquid form.

Accordingly, the scope of the invention is to be construed in accordance with the substance defined by the following claims.

What is claimed is:

1. A method of fabricating color filters for a display on a surface of a substrate, the method comprising:
   ejecting fluid droplets from one or more fluid droplet sources onto a transfer surface; and,
   transferring the fluid droplets from the transfer surface to the substrate by bringing the fluid droplets on the transfer surface into contact with the substrate.

2. A method according to claim 1, wherein the transfer surface comprises a pattern that is periodic in at least one dimension.

3. A method according to claim 2 comprising adjusting a spatial registration of the fluid droplets on the transfer surface.

4. A method according to claim 3, wherein the pattern comprises a pattern of varying surface energy and adjusting a spatial registration of the fluid droplets comprises permitting the fluid droplets to interact with the pattern.

5. A method according to claim 4, wherein the pattern comprises a plurality of fluid-droplet-retentive regions on an otherwise less fluid-droplet-retentive surface.

6. A method according to claim 5, wherein the fluid-droplets are water-based and the fluid-droplet-retentive regions are less hydrophobic than portions of the transfer surface between the fluid-droplet-retentive regions.

7. A method according to claim 5, wherein the fluid droplets are water-based and the fluid-droplet-retentive regions comprise depressions in a hydrophobic surface.

8. A method according to claim 5, wherein the fluid droplets are oil-based and the fluid-droplet-retentive regions are less oleophobic than a remainder of the transfer surface.

9. A method according to claim 5, wherein the fluid droplets are oil-based and the fluid-droplet-retentive regions comprise depressions in an oleophobic surface.

10. A method according to claim 2, wherein the at least one fluid droplet source comprises a plurality of fluid droplet sources spaced apart from one another by a separation and wherein there is an integer relationship between a spatial period of the pattern and the separation of the fluid droplet sources.

11. A method according to claim 1 comprising modifying one or more rheological characteristics of the fluid droplets while the fluid droplets are on the transfer surface.

12. A method according to claim 11, wherein modifying one or more rheological characteristics of the fluid droplets comprises at least one of: curing the fluid droplets, partially curing the fluid droplets, increasing a viscosity of the fluid droplets, changing a solubility of the fluid droplets, changing a surface energy of the fluid droplets and evaporating a solvent contained in the fluid droplets.

13. A method according to claim 11, wherein modifying one or more rheological characteristics of the fluid droplets comprises at least one of: irradiating the fluid droplets with electromagnetic energy; subjecting the fluid droplets to vacuum treatment, subjecting the fluid droplets to gaseous flow treatment, subjecting the fluid droplets to chemical treatment and heating the fluid droplets.

14. A method according to claim 1 comprising modifying sizes of the fluid droplets while the fluid droplets are on the transfer surface.

15. A method according to claim 1, wherein the one or more fluid droplet sources comprise an inkjet printer head.

16. A method according to claim 15, wherein ejecting fluid droplets from one or more fluid droplet sources onto a transfer surface comprises making multiple passes between the inkjet head and the transfer surface and, in each such pass, depositing a plurality of fluid droplets onto the transfer surface.

17. A method according to claim 16, wherein the plurality of fluid droplets deposited on a first pass are opaque.

18. A method according to claim 17, wherein the plurality of fluid droplets deposited on each pass subsequent to the first pass comprise fluid of a single color.

19. A method according to claim 18, wherein the colors comprise tones of red, green and blue.

20. A method according to claim 16, wherein the pluralities of fluid droplets deposited during successive passes are spatially interleaved with one another.

21. A method according to claim 1, wherein the transfer surface comprises a surface of a drum roller.

22. A method according to claim 21, wherein bringing the fluid droplets on the transfer surface into contact with the substrate comprises rolling the substrate against the drum roller.

23. A method according to claim 1, wherein the transfer surface is disposed on a cylindrical surface of a drum roller.

24. A method according to claim 23, wherein bringing the fluid droplets on the transfer surface into contact with the substrate comprises rolling the substrate against the drum roller.

25. A method according to claim 1, wherein the transfer surface comprises a belt member and the method comprises circulating the belt member while ejecting the fluid droplets onto the transfer surface.

26. A method according to claim 1, wherein a first plurality of the fluid droplets comprise a colorant.

27. A method according to claim 26, wherein a second plurality of the fluid droplets are opaque.

28. A method according to claim 1, wherein transferring the fluid droplets from the transfer surface to the substrate comprises making multiple passes between the transfer surface and the substrate and, in each such pass, transferring a plurality of fluid droplets onto the substrate.

29. A method according to claim 28, wherein the plurality of fluid droplets transferred on a first pass are opaque.

30. A method according to claim 29, wherein the plurality of fluid droplets transferred on each pass subsequent to the first pass comprise fluid of a single color.

31. A method according to claim 30, wherein the colors comprise tones of red, green and blue.

32. A method according to claim 29 comprising curing the plurality of opaque ink droplets that are transferred to the substrate in the first pass prior to any subsequent passes to provide opaque barriers on the substrate.

33. A method according to claim 28, wherein the pluralities of fluid droplets transferred during successive passes are spatially interleaved with one another.

34. A method according to claim 28 comprising curing the plurality of fluid droplets that are transferred to the substrate during each pass prior to transferring succeeding pluralities of ink droplets during succeeding passes.

35. A method according to claim 1 comprising curing the fluid droplets on the substrate.

36. A method according to claim 35, wherein curing the fluid droplets comprises one or more of: irradiating the fluid droplets with electromagnetic energy; subjecting the fluid droplets to vacuum treatment, subjecting the fluid droplets to gaseous flow treatment, subjecting the fluid droplets to chemical treatment and heating the fluid droplets.

37. A method according to claim 1 comprising photolithographically forming barriers on the substrate prior to transferring the fluid droplets from the transfer surface to the substrate.

38. A method according to claim 1, wherein the fluid droplets comprise one or more of: ink, resin, photo-resist and thermal resist.

39. A method according to claim 1, wherein the substrate comprises one or more of: glass, silicon and plastic.

40. A method of fabricating a color filter on the surface of a substrate, the method comprising:

ejecting fluid droplets from one or more fluid droplet sources onto a transfer surface, the transfer surface comprising a pattern that is periodic in at least one dimension;

allowing the fluid droplets to move on the transfer surface into registration with the pattern; and, transferring fluid droplets from the transfer surface to the substrate by bringing the fluid droplets on the transfer surface into contact with the substrate.

41. A method of fabricating a liquid crystal display, the method comprising:

forming a color filter on a first substrate by ink jetting fluid droplets onto a transfer surface and transferring the fluid droplets from the transfer surface to the first substrate; and encapsulating a liquid crystal compound between the color filter on the first substrate and a second substrate.

42. A method according to claim 41, wherein forming a color filter comprises adjusting a spatial registration of the fluid droplets on the transfer surface.

43. A method according to claim 42, wherein the transfer surface comprises a pattern that is periodic in at least one dimension and adjusting the spatial registration of the fluid droplets on the transfer surface comprises permitting interaction between the periodic pattern and the fluid droplets.

44. A method according to claim 43, wherein the periodic pattern comprises a plurality of fluid-drop-retentive regions on an otherwise less fluid-droplet-retentive surface.

45. A method of fabricating an organic light emitting diode (OLED) on a surface of a substrate, the method comprising:

ejecting fluid droplets from one or more fluid droplet sources onto a transfer surface the fluid droplets comprising organic materials; and, transferring the fluid droplets from the transfer surface to the substrate by bringing the fluid droplets on the transfer surface into contact with the substrate to form an OLED on the substrate.

46. A method of fabricating polymer semiconductor devices on a surface of a substrate, the method comprising:

ejecting fluid droplets from one or more fluid droplet sources onto a transfer surface the fluid droplets comprising constituent materials for one or more semiconductor devices, the fluid droplets arrange on the transfer surface in a predetermined configuration; and, transferring the fluid droplets from the transfer surface to the substrate by bringing the fluid droplets on the transfer surface into contact with the substrate to form one or more semiconductor devices on the substrate.

* * * * *